United States Patent [19]

Mori

[11] Patent Number: 4,591,984

[45] Date of Patent: May 27, 1986

[54] RADIATION MEASURING DEVICE

[75] Inventor: Issei Mori, Tochigi, Japan

[73] Assignee: Tokyo Shibaura Denki Kabushiki Kaisha, Kawasaki, Japan

[21] Appl. No.: 406,514

[22] Filed: Aug. 9, 1982

[30] Foreign Application Priority Data

Aug. 10, 1981 [JP] Japan .................. 56-125104
Aug. 28, 1981 [JP] Japan .................. 56-135115
Aug. 31, 1981 [JP] Japan .................. 56-136363

[51] Int. Cl.$^4$ ............................. G06F 15/42
[52] U.S. Cl. ..................... 364/414; 250/339; 250/363 S
[58] Field of Search .......... 364/414; 250/336.1, 250/339, 363 S, 307, 310; 378/19, 22

[56] References Cited

U.S. PATENT DOCUMENTS

| | | | |
|---|---|---|---|
| 3,717,753 | 2/1973 | Thomas | 364/414 |
| 3,878,392 | 4/1975 | Yew et al. | 250/307 X |
| 3,959,653 | 5/1976 | Lee et al. | 250/374 |
| 4,037,099 | 7/1977 | Oda et al. | 250/336.1 |
| 4,037,101 | 7/1977 | Okumura et al. | 250/310 |
| 4,058,724 | 11/1977 | McKinney et al. | 250/307 X |
| 4,068,306 | 1/1978 | Cheu et al. | 364/414 |
| 4,092,539 | 5/1978 | Pao et al. | 250/336.1 |
| 4,236,079 | 11/1980 | Sandland | 364/414 |
| 4,281,382 | 7/1981 | Knoll et al. | 364/414 |
| 4,476,386 | 10/1984 | Reid et al. | 250/310 |

*Primary Examiner*—Jerry Smith
*Assistant Examiner*—Louis Woo
*Attorney, Agent, or Firm*—Cushman, Darby & Cushman

[57] ABSTRACT

A radiation measuring device comprising a radiation detector for detecting radiation quantum arriving in the Poisson distribution, a phase height analyzer for analyzing a height of an output signal from the detector to extract signal components at a level within a predetermined level, converter for integrating an output signal from the detector to produce pulses of which the number corresponds to the integrated value, a switch for selecting the output signal from the analyzer when the number of arrival photons is smaller than a predetermined value and for selecting the output signal from the converter when the number of photons is larger than the predetermined value and a counter for counting output pulses of the selected analyzer or counter.

5 Claims, 24 Drawing Figures

RADIATION MEASURING DEVICE

BACKGROUND OF THE INVENTION

The present invention relates to a measuring device for measuring radiation of which radiation quantums occur in the Poisson distribution, such as X rays or γ (gamma) rays.

It is a common practice that a dosage of incident radiation such as X rays or γ (gamma) rays is measured by directly or indirectly counting photons of the incident radiation. In a typical indirect photon measuring method, an ionization chamber is used as a radiation detector. The photons are injected into the ionization chamber to ionize ionization gas contained therein. The ionization charges are extracted in the form of current. The amount of the current indicates an incident radiation dosage.

When a frequency of the arrivals of photons is low, the output signal from the radiation detector is detected in the form of a pulse each time that a photon arrives in the radiation detector or the ionization chamber. These pulses can be counted directly. In the case of the radiation with a low frequency of arrival photons, photons are individually detected by the abovementioned method and is directly subjected to a calculation for the radiation measurement.

Figure 1A:
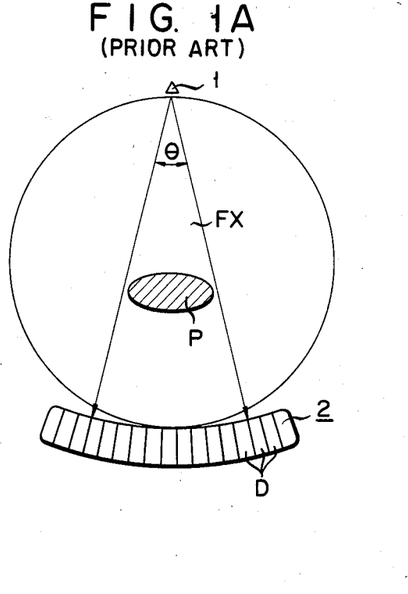
FIGS. 1A and 1B are, respectively, a plan view and a side view illustrating an arrangement of a radiation source and a radiation detector in a prior art X ray CT scanner.
Figure 1B:
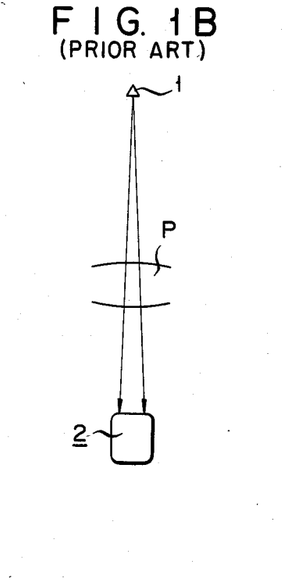

A tomography apparatus called a computerized tomography (referred to as a CT scanner) has been known as a radiation diagnosis apparatus. The apparatus is provided with an X ray source 1 for radiating a flat fan beam X ray Fx, and a radiation detector 2 with a plurality of radiation detector elements D for detecting the X ray, disposed side by side, as shown in FIGS. 1A and 1B. The X ray source 1 and the detector 2 are disposed opposite one another with an object P under exposure interposing therebetween. In operation, the X ray source 1 and the detector 2 are rotated about the object P in the same direction and at the same angular speed to collect the X ray radiation data on the cross sections of the object as viewed in various directions. The collected data is analyzed by an electronic computer to compute X ray absorptivity at individual positions of each cross section. The graduations are formed corresponding to the absorptivities to reconstruct picture information of the cross sections of the object. This apparatus can provide clear tomographies of the tissues from soft tissue to hard tissue.

The X ray detector 2 includes a number of radiation detecting cells each forming an ionization chamber filled with high pressure gas such as Xe (xenon). The detector detects the energy of X rays transmitted through the object P to produce an ionization current. The current is used as the detected data obtained by the X ray projection to the object.

For collecting the X ray radiation data, the X rays from the X ray source 1 are projected to the object P located between the X ray source 1 and the X ray detector 2. Photons in the radiation from the radiation source 1 oriented at a given angle are transmitted through the object P and enter the detector 2, through paths connecting each detector cell with the X ray source (referred to as an X ray path). In the detector 2, the photons impinge on the high pressure gas in the cells of the detector 2 to ionize the gas. The ionization charges are detected in terms of ionization current. The current is then integrated for a given period of time. The integrated value is discharged through a discharge circuit with a given time constant. The discharge time is used for the X ray radiation data on each X ray path related to each detector cell. After the data collection on every X ray path at the angular position is completed, the data collection on every X ray path at the next angular position starts.

In the CT scanner, the X ray absorptivity of the object depends largely on the arrival photon energy. The energy spectrum of the arrival photons is widely spread. For this reason, the picture image obtained by the method described above is different from that obtained by directly counting the arrival photon for providing the X ray absorption data. A simulation shows that when an object with tissues of which the X ray absorption are approximate to each other are photographed, they have a low contrast. Thus, if the indirect measuring method, in which the ionization charge is extracted and the radiation dosage is detected in the form of the electrical quantity, is used, an image formed is not clear. When the direct measuring method is employed, on the other hand, the image is clearly formed. For this reason, if the direct measuring method can be used, the advantages resulting from it are very great.

In the CT scanner, the frequency of the arrival of photons is very high and a great number of photons must be measured. In this respect, it has been difficult to detect and directly count individual photons, when considering the operating speed of the radiation detector and the counter at the present stage of development. To cope with this technical problem, the prior art treats randomly arriving photons as a continuous stream of photons. Accordingly, the output signal from the detector is produced in the form of a continuous stream of electrons, i.e. a current. In the prior art, the current output signal is amplified by a preamplifier, sampled for a given period of time (several msec.) and is integrated by an integrator. The output signal from the integrator is A/D converted into digital data and then applied to an electronic computer.

Figure 2:
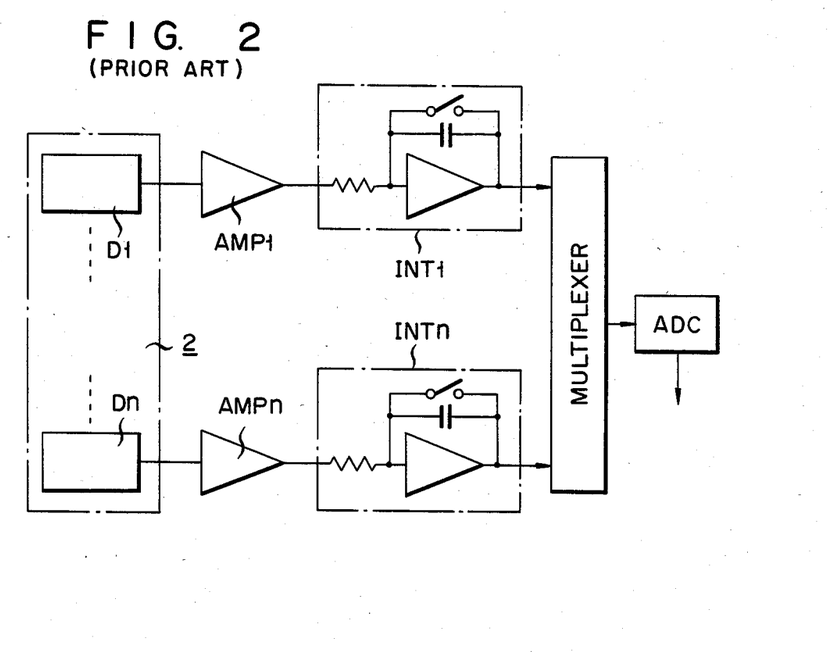
FIGS. 2 and 3 are circuit diagrams of prior art radiation detecting systems.

A scheme of such a photon detecting system is shown in FIG. 2. The radiation detector 2 is made up of a plurality of detecting cells D1 to Dn each of which is of the ionization chamber type, has a low response, and produces arrival radiation dosage in the form of current. The output currents from the individual cells D1 to Dn are amplified by preamplifiers AMP1 to AMPn, which are then integrated by integrators INT1 to INTn. The output signals from the integrators INT1 to INTn are selectively extracted by a multiplexer of which the output signal is in turn applied to an A/D converter ADC where it is converted into digital data. The digital data are applied as X ray absorption data to a host system such as an electronic computer.

Another prior art devices uses smoothing filters for the integrators. The output signals from the filters are sampled at fixed periods and applied to an A/D converter.

Figure 3:
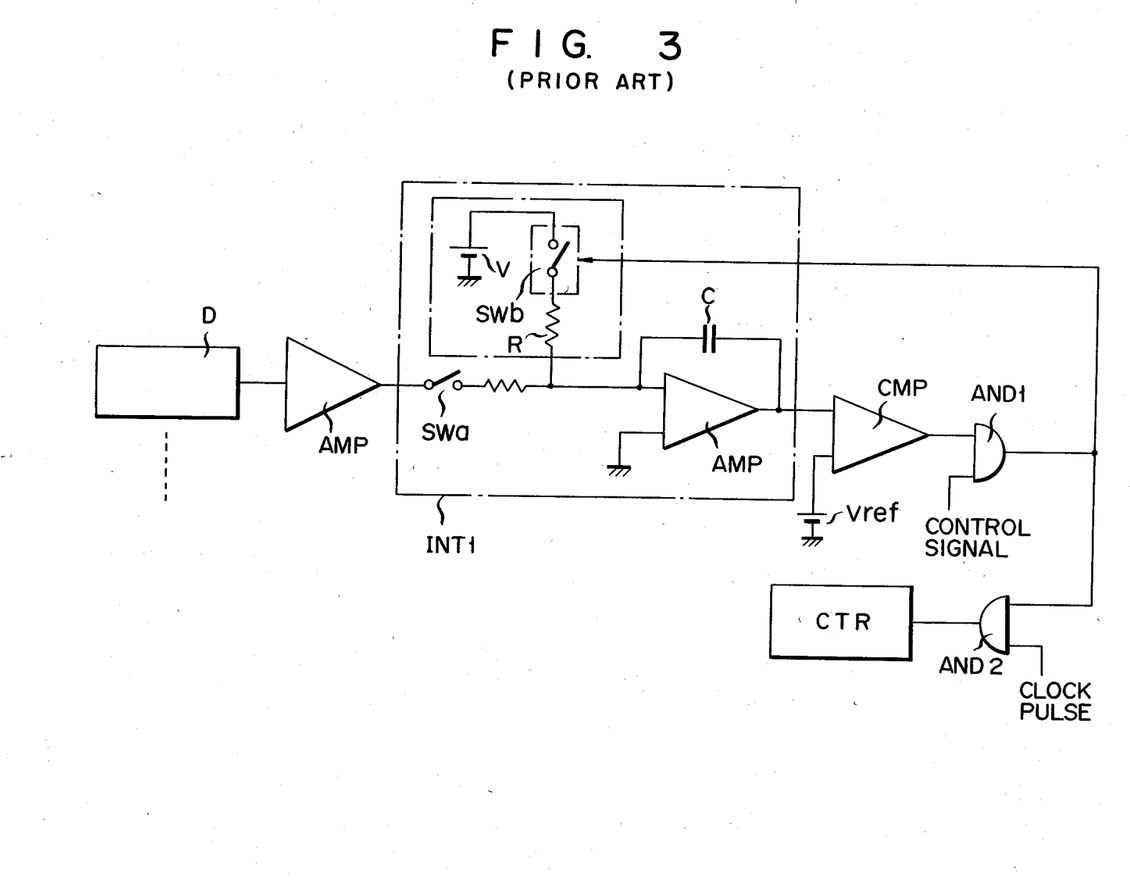

Another prior art device is illustrated in FIG. 3. As shown, the integrator INT1 is of the double integration type. The output signal from the integrator INT1 is compared with a reference voltage Vref by a comparator CMP. The output signal from the comparator CMP is taken out through an AND gate AND1. The output signal from the AND gate AND1 is used as a control signal for an AND gate AND2. With the control signal, the AND gate AND2 is controlled to allow a clock pulse to pass therethrough. The clock pulse is counted by a counter CTR to provide a count corresponding to the detected radiation dosage. The count value is used as digitalized X ray absorption data.

A switch SWa for switching an input signal is provided at the input stage of the integrator INT1. During an X ray radiation period of one pulse, the switch SWa is closed to store the output signal from the detecting element D into an integration capacitor C. The charge in the capacitor C is applied to a comparator CMP where it is compared with a reference voltage Vref. When the former exceeds the latter, the comparator CMP produces an output signal.

The output signal from the comparator is applied, during the X ray radiation rest period, to the AND gate AND1 controlled by a control signal transferred from a control system (not shown). Immediately after the X ray radiation for one minute ends, the output signal from the comparator is produced through the AND gate AND1.

Connected to the integrator INT1 are a DC power source V for feeding a charge with the opposite polarity to the integration capacitor C and a constant current source including a resistor R and a switch SWb. The switch SWb is closed by the output signal from the AND gate AND1. Accordingly, immediately after the X ray radiation ends, the switch SWb is closed and a constant current is fed to the input side of the integrator INT1. Then, the charge stored in the integration capacitor C is discharged according to a discharge characteristic.

As a result, the output level of the integrator INT1 drops to below a reference voltage Vref. Then, the output signal from the comparator CMP disappears and the output signal from the AND gate AND1 also disappears.

During this period, the output signal from the AND gate AND1 is applied as a gate control signal to the AND gate AND2. Accordingly, the AND gate AND2 applies the clock pulses received to the counter CTR during the gate controlled period. As a result, the counter CTR counts a count corresponding to the stored charge in the integrator INT1 to provide digital X ray absorption data corresponding to the arrival X ray dosage.

In the measuring systems shown in FIGS. 2 and 3, data is treated in an analog form in the processing system from the detector to the A/D converter. This fact is accompanied by the following problems.

(1) The photon data of photons randomly occurring, which is essentially digital data, is treated as analog data in most of the data processing system except the final stage of the process.

(2) Unless the noise in the analog system is be suppressed to an extreme (e.g. 10 to 30 uV-rms), when the X ray dosage is low or the attenuation of photons transmitted through the object is high, the noise in the analog system is relatively distinctive, and may damage the CT image quality. It is desirable that the S/N ratio of the CT image achieves a physical limitation determined by the number of photons.

(3) Unless the photon-charge conversion coefficient and a signal transmission function in the signal processing system from the detector to the signal processing system is reduced to a minimum, a measurement error occurs, so that an artifact deteriorates the sharpness of the image or the reliability of the measured values is reduced.

(4) Generally, even when the number of photons striking the detector is zero, the output signal from the processing system (the output signal from the A/D converter) is not zero because of the presence of the dark current and the off-set voltage of the amplifier. In order to prevent the error by the dark current or the off-set voltage, the output signal from the processing system, when its input is zero, is repeatedly measured at a short cycle to measure the offset data, and the off-set data is subtracted from the output signal of the processing system when the photon input is received.

(5) The arrival photons are not monocolor but multicolor and hence have widely distributed energy spectrums. As for individual photons, the shorter the wavelength of the photon, the larger the output charge or output current from the detector becomes. As for the difference in the absorption coefficients of the tissues in the object, it becomes more intensified as the energy of the photon goes lower. For this reason, in simple X-ray photographing, it is desirable that the X-rays at low energy (longer wavelength) should be used for photographing the soft tissue. However, in a conventional CT, the output signal from the measuring system is greatly influenced by the photons at high energy, while it is less influenced by the photons at low energy containing precise information of a minute difference in X ray absorptions of the tissues in the object. As a result, a resolution of the CT image at a low contrast is reduced.

These problems can be solved if the arrival photons can be individually detected and counted.

To detect and count individual photons of the X ray at a high dose rate, the operating speed of the detector and the counter must be extremely high. The arrival rates of photons arriving at each detector of some typical X ray CT scanners are given in Table 1.

TABLE 1

| | Objects | Number of photons/sec |
|---|---|---|
| A | None (All air) | $4 \times 10^8$ |
| B | Test phantom with a container of 120 mm in diameter containing water | $4 \times 10^7$ |
| C | Test phantom with a container of 240 mm in diameter containing water | $4 \times 10^6$ |

A continuous X ray at 120 KV/20 mA was used for an X ray source when creating the above table. When an organism is used for the object, the measuring error must be within about ±1%. This tolerance is selected so as not to disturb a physical limitation of the S/N ratio determined by the number of the arrival photons. The number of arrival photons in the case of the head of a human is substantially equal to that in the case of the water contained in the 120 mm container, and is about $4 \times 10^7$ times/sec. For detecting all the arrival photons, the detector and counter are required to operate following the occurence at the photons of $4 \times 10^7$ times/sec. Actually, a distribution of the photons is random and not uniform. Therefore, the measuring system operating simply at 40 MHz fails to detect all of the respective photons.

Figure 4A:
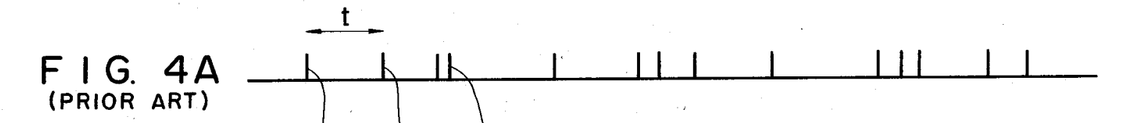
FIGS. 4A and 4B show prior art waveforms of signals of randomly occuring X ray photons.
Figure 4B:
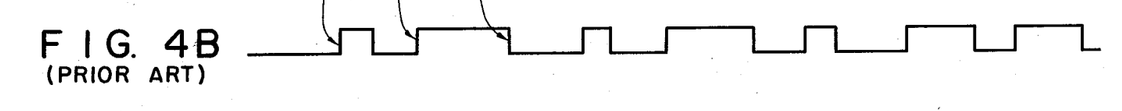

This phenomenon will be described in more detail referring to FIGS. 4A and 4B, 5A to 5C, FIG. 6 and FIG. 7. It is assumed that photons arrive at the detector one for t seconds and at random periods, as shown in FIG. 4A. The response of the detector is relatively slow to such an extent that it takes at least t seconds to count the succeeding a second photon. Accordingly, photon arriving within the interval t is treated as if it is a part of the preceeding photon, and is made to correspond to one pulse. This phenomenon is called a "bunching" and frequently occurs in the detector of the CT scanner. In this explanation, the detector contains a discriminator for discriminating the arrival photons from the noise. As seen from FIG. 4B, showing the output signal from the detector, the detector can detect only seven photons of the 14 arrival photons, even if the counting speed is high.

Figures 5A, 5B, 5C:
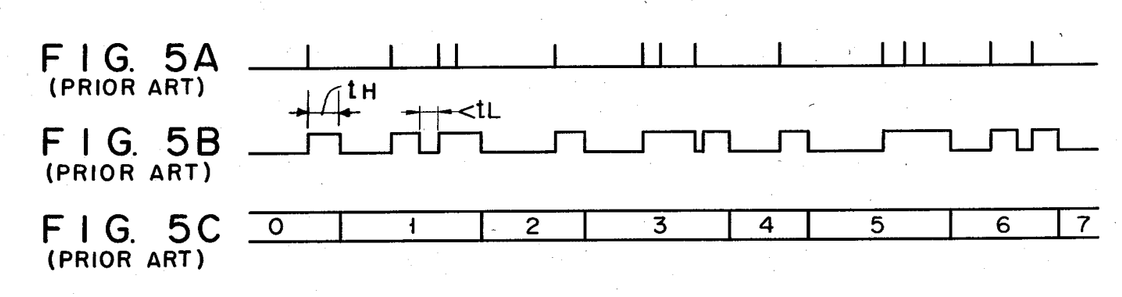
FIGS. 5A to 5C show prior art waveforms of randomly appearing X ray photons and the output signals from the detector.

FIGS. 5A to 5C illustrate waveforms in a case where the response speed of the detector is ideal but the counter's operating speed is low. FIG. 5A illustrates a distribution of arrival photons, and FIG. 5B shows a waveform of the input signal to the counter. For executing the incremental operation of the counter, the high level period of the signal for each count is $t_H$ or more and the low level period is $t_L$ or more. The counter must see a pulse duration of $t_H$ or greater followed by a delay of $t_L$ or greater in order to count one photon. Therefore, when the pulse is a positive pulse, as shown in FIG. 5A, the positive level period must be continued for the time period $t_H$ or more, as shown in FIG. 5B. If the pulse is shaped such that the positive level period of the output signal from the detector continues over the time $t_H$, the counter counts only seven photons, which is the half of the total arrival photons, for one cycle of counting operation, as described referring to FIGS. 4A and 4B.

In any of these cases shown in FIGS. 4A and 4B, and FIGS. 5A to 5C, the state of bunching varies due to the instability of the response of the detector or the set time $t_H$ drifts. As a result, a characteristic of the detecting and counting system is that a % of the input photons are dropped in counting transitions, so that the measuring sensitivity drifts even though the measuring system is of the digital type.

Figure 6:
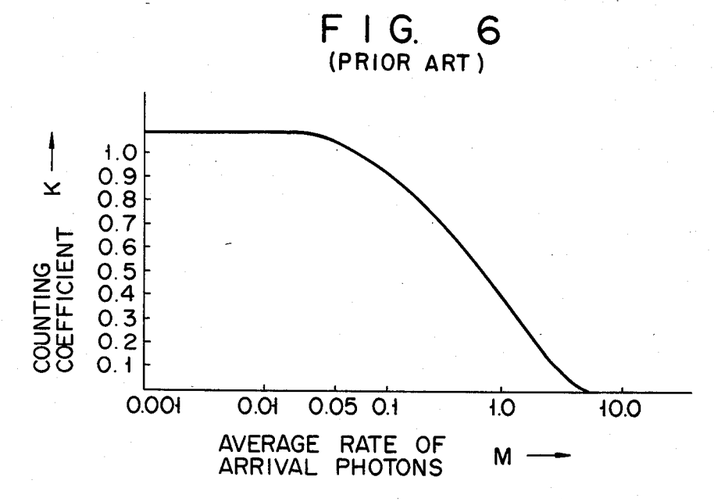
FIGS. 6 and 7 show the relationship of the average rate of arrival photons to the counting coefficient and the count value of a prior art measuring device.

FIG. 6 shows the value of a counting coefficient K (i.e. a ratio of the number of the arrival photons to the count of the photons by the counter) when a number M of events, e.g. the average number of photons arriving during a minimum operation cycle (10 ns) of a prior art device. In the case of FIG. 5, the characteristic curve is expressed by $K = e^{-M}$ where e is a natural logarithm.

Figure 7:
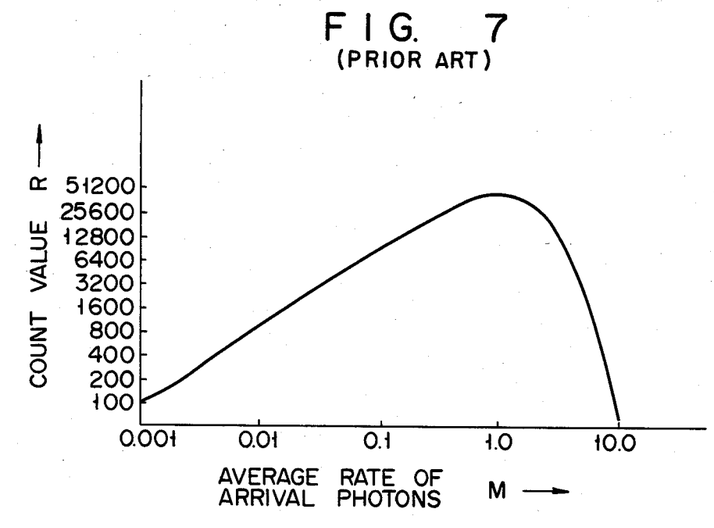

FIG. 7 shows count values R when a circuit with a minimum operation cycle of 10 ns counts a number M of random events, which occur during 1 ms. As seen from FIGS. 6 and 7, in the prior art device, as the average rate of the photons arriving during the minimum operation cycle increases, the detecting and counting systems fail to follow the occurence of the photons, so that the number of the count is abruptly decreased resulting in incorrect counting.

SUMMARY OF THE INVENTION

Accordingly, an object of the present invention is to provide a radiation measuring device which can measure radiation quantum at a high frequency and a random frequency.

DETAILED DESCRIPTION OF THE PREFERRED EMBODIMENTS

An embodiment of the present invention will be described referring to FIG. 8.

Figure 8:
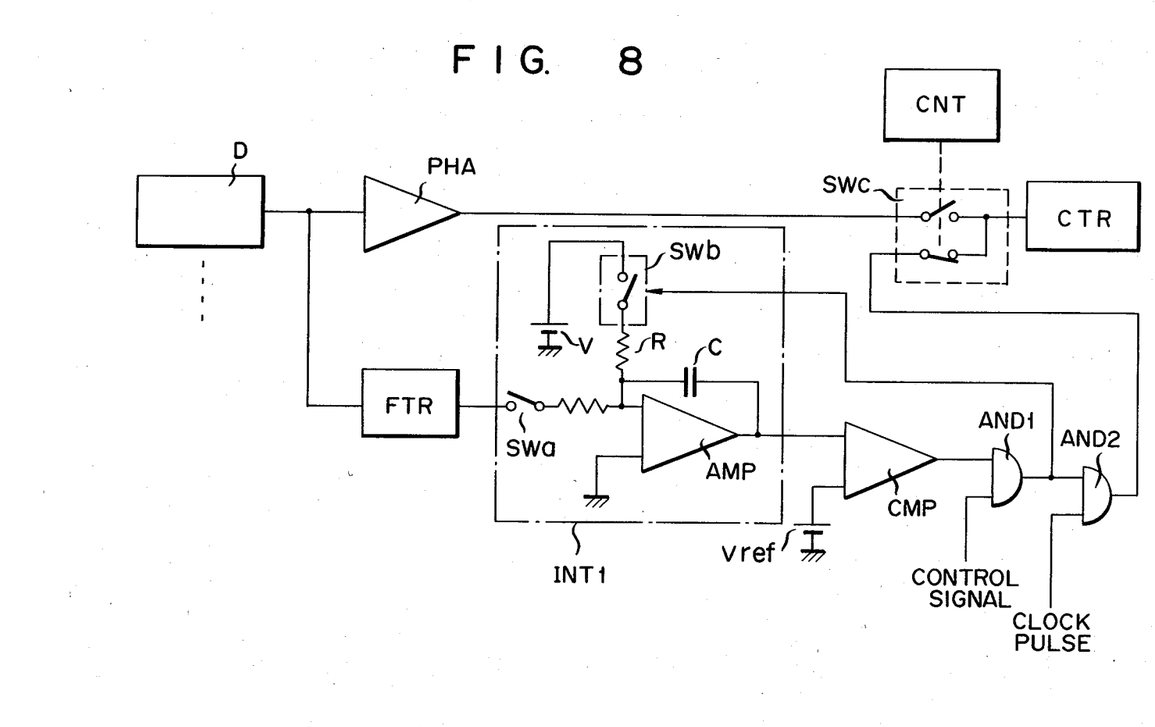
FIGS. 8 and 9 are each a block diagram of embodiments of a measuring device according to the present invention.

In FIG. 8, D designates a radiation detector element and has a response characteristic which allows generation of pulses corresponding to photons arriving when radiation at a low radiation dose rate is incident on the detector D.

In the figure, FTR designates a low pass filter for smoothing an output signal from the detector D and INT1 an integrator for double-integrating an output signal from the filter FTR, and is the same as the integrator INT1. A comparator CMP compares the output signal from the integrator INT1 with a reference voltage Vref to produce an outut signal during a period that the output signal from the integrator exceeds the reference voltage Vref. A first AND gate AND1 responds to a gate control signal applied from a control system (not shown) during a reset period following the radiation to allow the output signal from the comparator CMP to pass therethrough. This configuration is useful when it is desired to take photographs during the radiation process. A second AND gate AND2 responds to an output signal from the first AND gate AND1 to allow a given clock pulse externally applied to pass therethrough. The integrator INT1, the comparator CMP, and the AND gates AND1 and AND2 have the same constructions as those in FIG. 3. Also in the present invention, a constant current source, including a DC power source V, the resistor R and the switch SWb, which are provided in the integrator, for providing a constant current discharge from an integrator capacitor, is so arranged that the switch SWb is closed by the output signal from the first AND gate AND1 for the constant current discharge.

The fliter FTR, the integrator INT1, the comparator CMP, the AND gates AND1 and AND2 make up a photon detecting system of the analog type.

A pulse height analyzer PHA receives the output signal from the radiation detecting element D, and allows only a signal at a level higher level than a predetermined level to pass therethrough, on the basis of the result of the discrimination. A selection switch SWc selects either of the pulse from the discriminator PHA and the pulse from the second AND gate AND 2. A controller CNT controls the switching operation of the selection switch SWc according to the radiation dose rate. A counter CTR counts pulses coming through the selection switch SWc.

The operation of the radiation measuring device thus constructed will be described.

In the ordinary X ray CT equipment, a radiation dose rate of radiation incident on the radiation detecting element D is roughly predicted before the scanning for picking up an image or collecting data starts. The reason for this is that before the scanning operation, data relating to X ray radiation conditions, a slice width of a cross section of an object under diagnosis, a size of the scanning field, and the like are inputted to the host computer. Since the size of the scanning field indicates the size of the object, it is possible to predict an intensity of X rays in some degree. The data to indicate a portion of the object to be scanned is contained in the previously inputted data. Alternatively, an operator can key in the information of high dose rate scanning or low dose rate scanning into the computer since he already knows the radiation dose rate of the scanning to be performed.

In the present invention, when it is predicted that radiation at a relatively high radiation dose rate will arrive, the controller CNT operates the selection switch SWc to couple the signal from the second AND gate AND2 with the counter CTR. The detector D has a response characteristic high enough to produce pulses corresponding to the arrival of individual X ray photons at a relatively low radiation dose rate. For the radiation at a relatively high radiation dose rate, however, it produces a substantially continuous detecting signal. The output signal from the detecting element D is passed through the filter FTR to be smoothed, and then is stored in the integrator INT1. After a fixed time period (sampling period, e.g. an X ray radiation period of one pulse) elapses, the charge stored in the integrator capacitor C of the integrator INT1 is discharged through the route of the resistor R, the switch SWb and the DC power source V at a fixed speed. The counter CTR counts the clock pulses until the discharge ends. The low pass filter FTR is provided for preventing the integrator circuit from erroneously operating due to high frequency components, and it is not essential to this circuit construction.

A switch SWa is provided at the input stage of the integrator INT1. This switch SWa is closed for the radiation period of one pulse period so that the output signal applied from the detecting element through the filter FTR is stored in the capacitor C. The charge stored in the capacitor is applied to the comparator CMP where it is compared with the reference voltage Vref. During the period that the charge exceeds the reference voltage Vref, the comparator CMP produces an output signal.

The comparing output signal from the comparator is applied to the AND gate AND1 which is controlled by the control signal applied from the control system (not shown). Immediately after the X ray radiation for one pulse duration is completed, the output signal from the comparator is taken out through the AND gate AND1.

The integrator INT1 is connected to a constant current source including the DC power source V for feeding a charge with opposite polarity to the capacitor C, the resistor R and the switch SWb. The switch SWb is closed in response to the output signal from the AND gate AND1. After the X ray radiation terminates, the switch SWb is immediately closed, so that a constant current is fed to the input side of the integrator INT1. The charge stored in the capacitor C is discharged at a fixed discharge current.

The output signal from the integrator INT1 reduces below the level of the reference potential Vref. Then, the output signal from the comparator CMP disappears and the output signal from the AND gate AND1 also disappears.

During this period, the output signal from the AND gate AND1 has been applied as a gate control signal to the AND gate AND2. The AND gate AND2 allows the clock pulse to go to the counter CTR during the input period of the gate control signal. As a result, the counter CTR counts the clock pulses corresponding to the charge stored in the integrator INT1, so that it can obtain the digital value corresponding to the arrival X ray dosage to the detector as the X ray absorption data.

The above-mentioned system is for measuring the output signal from the detecting element D in the form of a digital value using the double integration at the time of X ray radiation at a high radiation dose rate.

When the arrival radiation dose rate to the element D is predicted to be below a given value, the controller CNT switches the switch SWc to the discriminator PHA. In this case, the arrival photons are discretely counted and hence the output signal from the element D is a train of pulses corresponding to individual arrival photons. These pulses are discriminated from noise by the discriminator PHA so as to have a pulse height high enough to drive the counter CTR. The pulses are applied to the counter CTR where they are counted. When the counting during the sampling period is completed, the result of the count corresponding to the number of arrival photons during the period is transferred to the host computer.

As described above, the radiation measuring device has two systems; a digital conversion system of the double integration type and a direct counting system for discriminating the pulse height of the arrival photons and counting the discriminated pulses. The digital system is used for the radiation at a high dose rate, while the direct counting system is used for the radiation at a low dose rate. Since the radiation dose rate can previously be known from the objective of diagnosis or a portion of the object to be diagnosed, a proper measuring system can be selected from these two systems. In the prior art device, when the dose rate of the radiation to the detector is extremely low, noise and characteristic drift in the analog system are not distinguishable from the individually arriving photons. The mesuring system of the present invention does not suffer from such problems since the photons can individually be counted. As for the measurement of radiation at a high dose rate, the conventional analog system, or the digital conversion system of the double integration type, is used. Accordingly, the high speed response characteristics required for the pulse height analyzer and the counter are normally operable for a frequency of arrival photons at a low dose rate. For this reason, the present invention enables X ray CT equipment of the direct count type to be realized. The common use of the counter for both circuit systems leads to cost reduction and saving of space for a component package. Further, for the low dose rate measurement, the conventional scanning method and the scanning method of the direct counting system can both be applicable. Different data obtained when both methods are applied for the low dose rate may provide additional data useful in the diagnosis.

Figure 9:
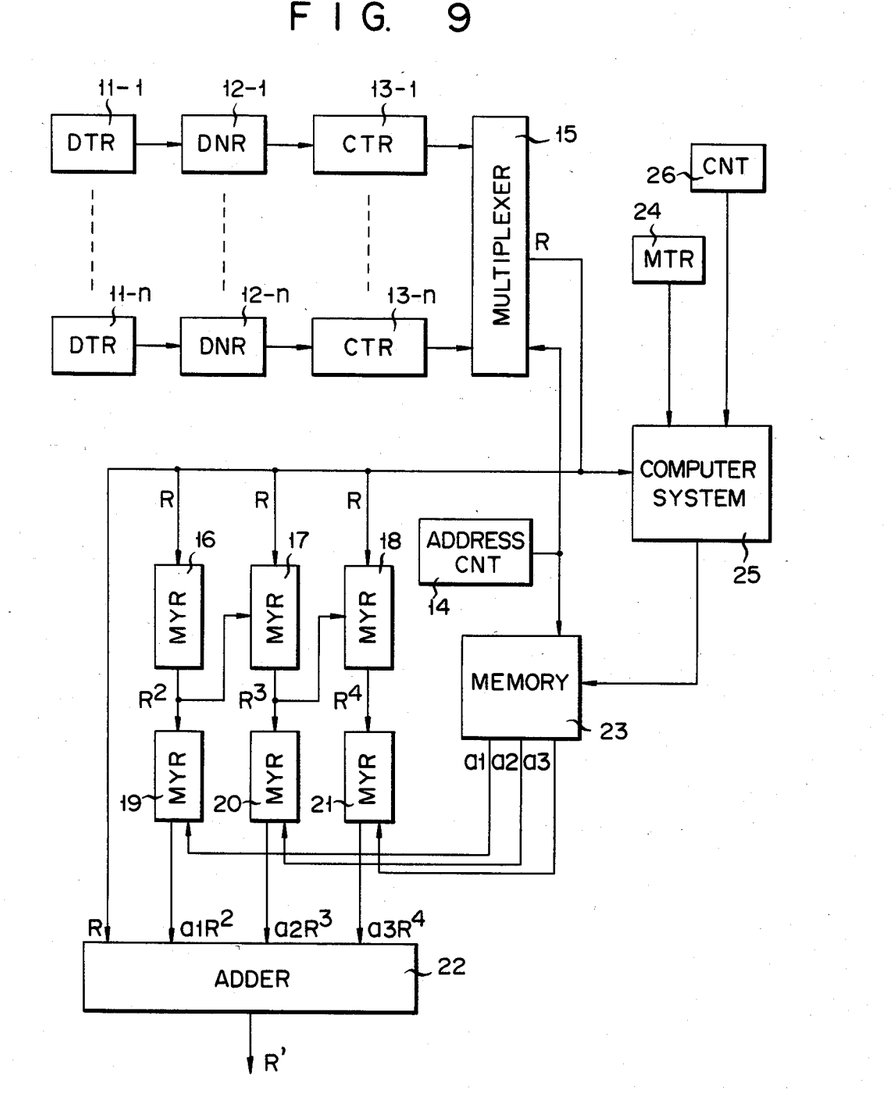

FIG. 9 illustrates another embodiment of a radiation measuring device according to the present invention. 11 (11$_1$ to 11n) is a radiation detector for detecting photons arriving randomly. 12 (12$_1$ to 12n) is a discriminator for discriminating an effective signal from noise contained in the arrival signal. 13 (13$_1$ to 13n) is a counter for counting the output signal of the discriminator 12. A channel made up of the detector 11, the discriminator 12, and the counter 13 reliably counts the input signal of photons arriving at time intervals of t or more, but incorrectly counts the input signal at photons arriving at time intervals of t or less and the "bunching" occurs. The same thing is true for the remaining channels. The output signals, or the result of the counts from the channels, are time-sequentially selected by a multiplexer under control of an address controller 14. The output signals from the multiplexer 15 are applied to multiplixers 16 to 21 where these are subjected to an operation given by the equation (1).

$$R' = R + a1R^2 + a2R^3 + a3R^4 \qquad (1)$$

The output signals from these multipliers 16 to 21 are applied to an adder 22 where they are added together and the result of the addition is produced as data R' from the adder 22. More particularly, the data R from the multiplier 16 is produced as an $R^2$ signal. The multiplier 17 multiplies the data $R^2$ from the multiplier 16 by the data R from the multiplexer 15 to produce a data $R^3$. The multiplier 18 multiplies the data R from the multiplexer 15 by the data $R^3$ from the multiplier 17 to produce data $R^4$. The output data $R^2$ to $R^4$ from the multipliers 16 to 18 are applied to the multipliers 19 to 21, respectively. Constants a1 to a3 corresponding to selected channels, which are read out from a memory 23 and have been inputted to the multipliers 19 to 21, respectively. These multipliers 19 to 21 multiply the input data by these constants to produce data $a1R^2$ to $a3R^4$, respectively. These data from the multipliers 19 to 21 are applied to the adder 22. The channel data R is also applied to the adder 22. The adder 22 sums these data to produce data R'.

How to derive the constants a1 to a3 will be now described. According to the Poisson distribution, a probability P of arrival of one or more photons after an occurence of a photon is given by the following equation (2).

$$P = \sum_{m=1}^{\infty} W(m), \quad W(m) = \frac{M^m}{m!} e^{-M} \qquad (2)$$

where m is the number of arrival photons and M an average rate of arrival photons for t sec, W(m) is a probability that photons of m arrive. The P also includes a false count rate, and hence the counting coefficient K is given $$K = \frac{R}{N} = 1 - P = 1 - \sum_{m=1}^{\infty} W(m) = \qquad (3)$$

$$= 1 - \left\{ \sum_{m=0}^{\infty} W(m) - W(o) \right\}$$

$$= 1 - (1 - e^{-M}) = e^{-M}$$

where N is the total number of photons arriving within the period T sec, and M = (t/T) × N.

A relationship between the number of true photons and the result of the count R is given by the following equation (4)

$$R = K \cdot N = Ne^{-N\frac{t}{T}} \qquad (4)$$

when $M = \frac{t}{T} \cdot N < 1$, we have the count result R $$R = Ne^{-N\frac{t}{T}} = \qquad (5)$$

$$N \left[ 1 - N\frac{t}{T} + \frac{\left(-N\frac{t}{T}\right)^2}{2} + \ldots + \frac{\left(-N\frac{t}{T}\right)^n}{n!} + \ldots \right]$$

As seen from the equation (5), the count result R monotonously increases. Therefore, the total number of arrival photons can be obtained from the characteristic of R shown in FIG. 7, as given by the equation (6)

$$N = F(R) = R(1 + a1R + a2R^2 + a3R^3 + \ldots) \qquad (6)$$

Here, the constants a1, a2, a3, . . . are functions of t/T. Therefore, the total number of the arrival photons can be obtained through mathematical analysis which will be omitted since it is not essential to the present invention. Normally, a satisfactory measuring accuracy is obtained by the calculation up to the term of a3. The calculation of the count result R up to the term of $(-N \times t/T)^4$ allows N = F(R) in the equation (6) to easily be obtained in a mathematical analytical method. The analytical calculation of the total number N will be omitted here. For making a look-up table describing a conversion from the count result R to the total number N of arrival photons, the minimum time interval t free from the "bunching" the measuring system actually measured. The counting time T is set to a given value since it easily allows such a setting of a time value. Then, the counting coefficient K is applied using these time values according to the equation $K = e^{-N(t/T)}$. A relationship between the count result R (=KN) and N is obtained on the basis of the calculation. The look-up table can approximately be expressed by the equation (6) as a polynomial of R.

When comparing the equation (1) with the equation (6), it is seen that the output signal R' of the adder 22 is related to the total number of photons N and these are given by R' ≈ N. If $t_H + t_L$ of the channels are all equal to one another, the operation circuit, including the multipliers 16 to 21 and the adder 22, can be replaced by the look-up table. On the other hand, if $t_H + t_L$ of the channels are different from one another, the constants a1, a2 and a3 corresponding to the channels are previously calculated and the results of calculations are stored in the memory 23. $t_H + t_L$ generally drifts. For calibrating the drift to correct the constants a1, a2 and a3, the total number N of arrival photons as a known value and the count result R are compared to produce a difference. The difference obtained is used for correcting the constants a1, a2 and a3. In measuring the number of photons of an X ray, a dose rate monitor 24 always monitors a dose rate of arrival radiation and applies the result to the computer system 25. Under control of the attenuator controller 26, an attenuator with a known X ray transmittivity is placed in an X ray path for a given timing. The attenuator controller may be replaced by a corresponding manual operation. The transmittivity data obtained from the attenuator is inputted to the computer system 25. The computer system can calculate the total number of photons at this time point on the basis of the data obtained. At the same time, the output data R from the channels are inputted to the computer system 25. Accordingly, the computer calculates K ($=e^{-Nt/T}$) on the relationship between the output data R and the total number of photons N coming through the attenuator, obtains t/T using K and N, revises the previous look-up table from the output data to the total number of arrival photons, and further calculate corrected constants a1, a2 and a3. Then, the corrected constants are stored in the memory 23. The total number of the arrival photons N of the channels are slightly different from one another because physical configurations of the detectors $11_1$ to $11_n$ are different. The computer system 25 can recognize this difference of the total number N by obtaining the output data R of the channels with a known X ray radiation at a low dose rate at which $K \approx 1$ holds. In this respect, there arises no problem as for the accuracy of N.

Through the processing described above, the count result is corrected to allow linear counting within a range (up to about M=1.0) where the characteristic curve shown in FIG. 7 exhibits a linear increase. The counting accuracy is considerably high when considering the statistical variations arising from the nature of the radiation source.

With such an arrangement, the maximum operating frequency of the detecting system and the counting system for counting random quantum at the average frequency f times/sec may be f times/sec. As seen from the foregoing, according to the present invention, a CT scanner of the direct counting type can be realized at acceptable cost and size. The radiation which can not be measured because of the counter speed can be measured by the radiation measuring device if the arrival quantum exhibits a random function.

In FIG. 9, the conversion from R to N is performed through the calculation of a polynomial. If the memory has a large capacity, this conversion can be performed using a look-up table provided for each channel. The operation of the group of the multipliers and the adder can be made by a general array processor. The correcting calculation can be executed using software.

Figure 10:
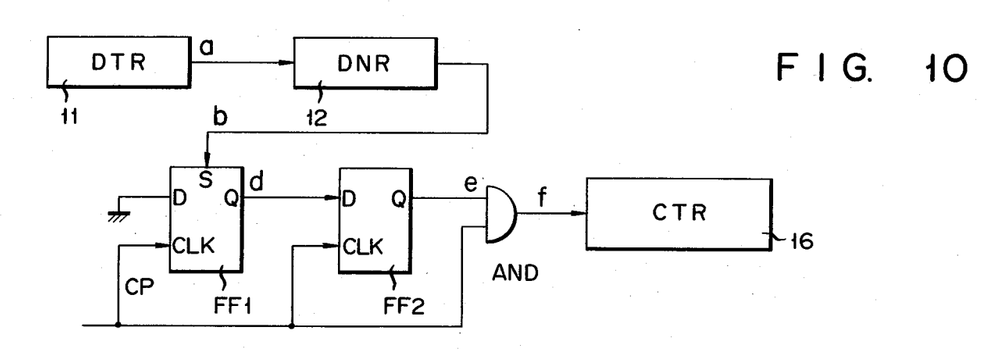
FIG. 10 is a block diagram of a measuring system according to another embodiment of the present invention.
Figures 11A, 11B:
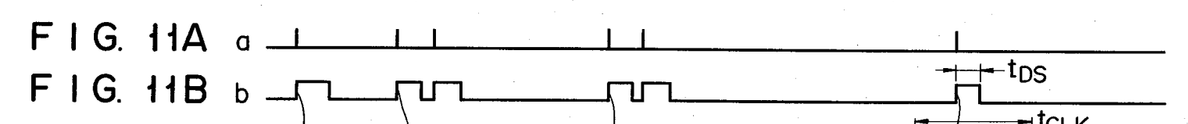
FIGS. 11A to 11F show a set of waveforms at key portions in the measuring system shown in FIG. 10.
Figure 11C:
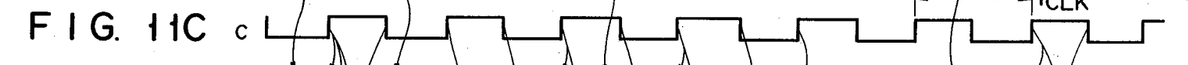
Figure 11D:
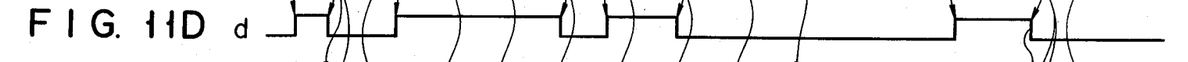
Figure 11E:
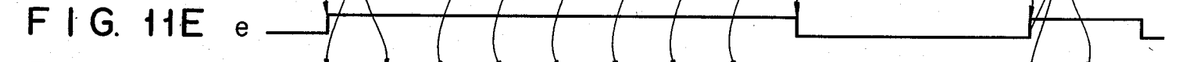
Figure 11F:
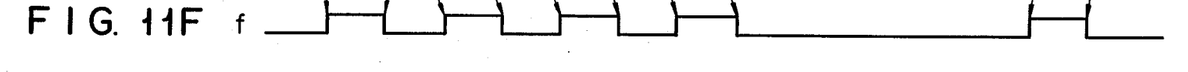

FIG. 10 shows a block diagram of only the counter section as an another embodiment of the present invention. The waveforms at the key portions in the circuit of FIG. 10 are shown in FIGS. 11A to 11F. FIG. 11A shows a photon signal arrivaing at the detector 11; FIG. 11B a waveform of a signal from the radiation detector 11 from which the noise components are removed; FIG. 11C a waveform of the clock signal, FIG. 11D a waveform of an output signal from a flip-flop FF1; FIG. 11E a waveform of an output signal from the flip-flop FF2; FIG. 11F a waveform of an output signal from an AND gate AND.

For incrementally operating the counter for counting the arrival photons in response to the output signal from the detector, at least $t_{CLK}$ is required for one cycle of the fundamental clock. The pulse width of the pulse signal from the detector, or from the discriminator, is $t_{DS}$, which is shorter than $t_{CLK}$. It is assumed that the detector can separately detects photons arriving at time intervals of $t_{DS}$, but it suffers from the "bunching" for the photons coming at time intervals at $t_{DS}$ or less. To cope with this problem, the measuring device of the present embodiment is so designed that when the detector produces an output signal, the counter counts it, but when "bunching" continuously occurs in the detector output signal for a long time, the fundamental clock is counted. The total value is corrected by the counting coefficient determined by the number of arrival photons. The value obtained is approximate to the true value. This can be predicted from the fact that the arrival of photons is in the form of the Poisson distribution. The counting coefficient, or an average count per $t_{CLK}$, can be obtained in the following way. It is assumed that a probability that radiation quantum or photons according to the Poisson distribution arrive m times within the period of $t_{CLK}$ is W(m). A frequency of average arrivals of photons per minimum cycle is M.

(1) Poisson distribution gives $$W(m) = \frac{M^m}{m!} e^{-M}.$$

(2) A probability P (1) that at m=1, one arrival photon is counted "1" is $$P(1) = \frac{t_{CLK} - t_{Ds}}{t_{CLK}}.$$

A probability P (2) that at m=1, one arrival photon counted "2" is (i.e. a probability that the pulse width $t_{DS}$ extends over two clocks and no succeeding photon is present at the second clock) is $P(2) \times W(0)$.

Incidentally, P(1)+P(2)=1.

(3) A similar discussion is applied for the case of m=2 or more.

From the above relations, we have $$r = \sum_{m=1}^{\infty} W(m) + \left[ W(1) \cdot P(2) + \sum_{m=2}^{\infty} W(m)P(1)P(2) \right] \cdot W(0) \quad (7)$$

$$= (1 - e^{-M}) + [Me^{-2M}P(2)] +$$

$$[1 - (1 + M)e^{-M}]e^{-M} \cdot P(1) \cdot P(2)$$

Thus, when photons arrive an average of M times within the period of $t_{CLK}$, the counter counts r.

Table 2 tabulates a relationship among M, r, the counting coefficient K (=r/M), the result of count R and the total number of photons N when $$P(2) = \frac{t_{DS}}{t_{CLK}} = 0.1,$$

T=1 msec and $t_{CLK}=$ nsec.

TABLE 2

| N | M | r | K | R |
|---|---|---|---|---|
| 10³ | 10 | 0.999959 | 0.0999959 | 9995.9 |
| 5 × 10⁵ | 5 | 0.993867 | 0.1987734 | 99386.7 |
| 3 × 10⁵ | 3 | 0.954545 | 0.3181816 | 95454.5 |
| 10⁵ | 1 | 0.654403 | 0.654403 | 65440.3 |
| 3 × 10⁴ | 0.3 | 0.278109 | 0.92703 | 27810.9 |
| 10⁴ | 0.1 | 0.103730 | 1.03730 | 10373.0 |
| 3 × 10³ | 0.03 | 0.032418 | 1.0806 | 3241.8 |
| 10³ | 0.01 | 0.010935 | 1.09345 | 1093.5 |
| 10² | 0.001 | 0.001100 | 1.100 | 110.0 |

Figure 12:
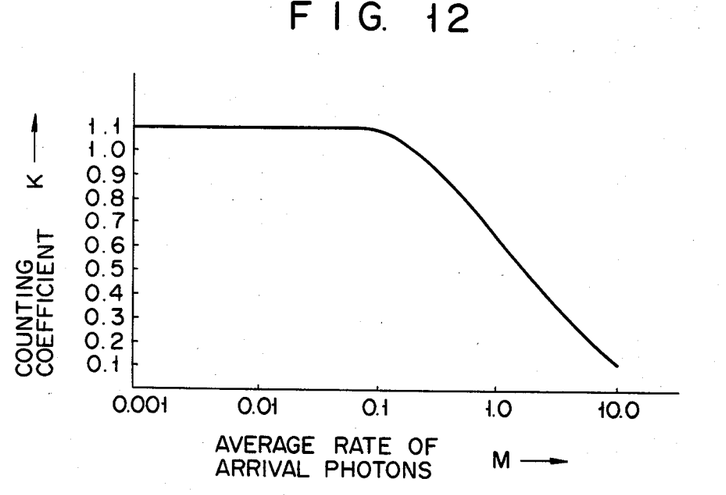
FIGS. 12 and 13 show the relationship of an average rate of arrival photon to a counting coefficient and a count value in the measuring system shown in FIG. 10.
Figure 13:
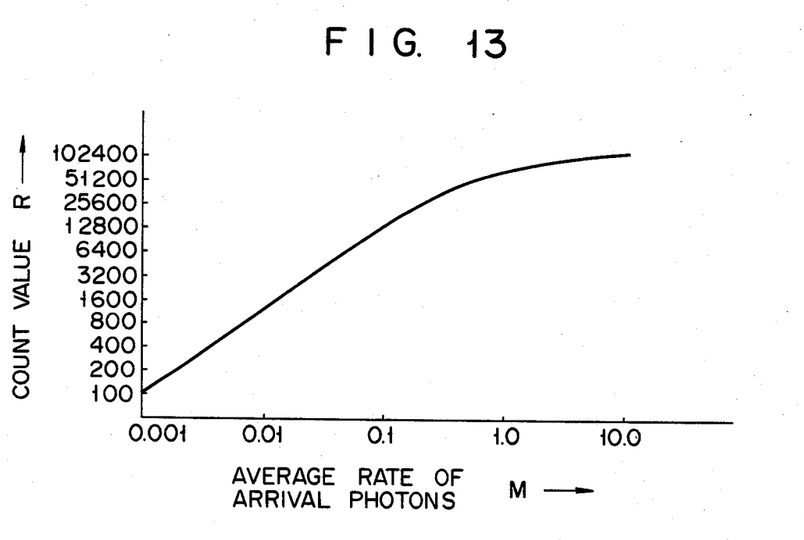

FIG. 12 illustrates a variation of the counting coefficient K against M. FIG. 13 illustrates a variation of count value R against an average number of arrival photons. Note here that the count value increases linearly with respect to the average number of arrival photons M.

Accordingly, when the radiation takes the Poisson distribution, the true data N can be obtained in a manner such that the counting coefficient K is previously obtained against the average number of arrival photons and the result of the measurement R is multiplied by 1/K. This may mathematically be expressed as given below.

When $P(2) = \frac{t_{DS}}{t_{CLK}}$ is sufficiently small, $r = 1 - e^{-M}$, and K is given $$K = \frac{1 - e^{-M}}{M} \tag{8}$$

And $R = (1 - e^{-M}) \cdot \frac{T}{t_{CLK}}$ (9)

Hence, $$\frac{1}{K} = \frac{-\ln(1 - t_{CLK} \cdot R)}{\frac{t_{CLK}}{T} \cdot R} \tag{10}$$

Then, we see that the true data $$N = \frac{1}{K} \cdot R = \frac{-\ln\left(1 - \frac{t_{CLK}}{T} \cdot R\right)}{\frac{t_{CLK}}{T}} \tag{11}$$

Figure 14:
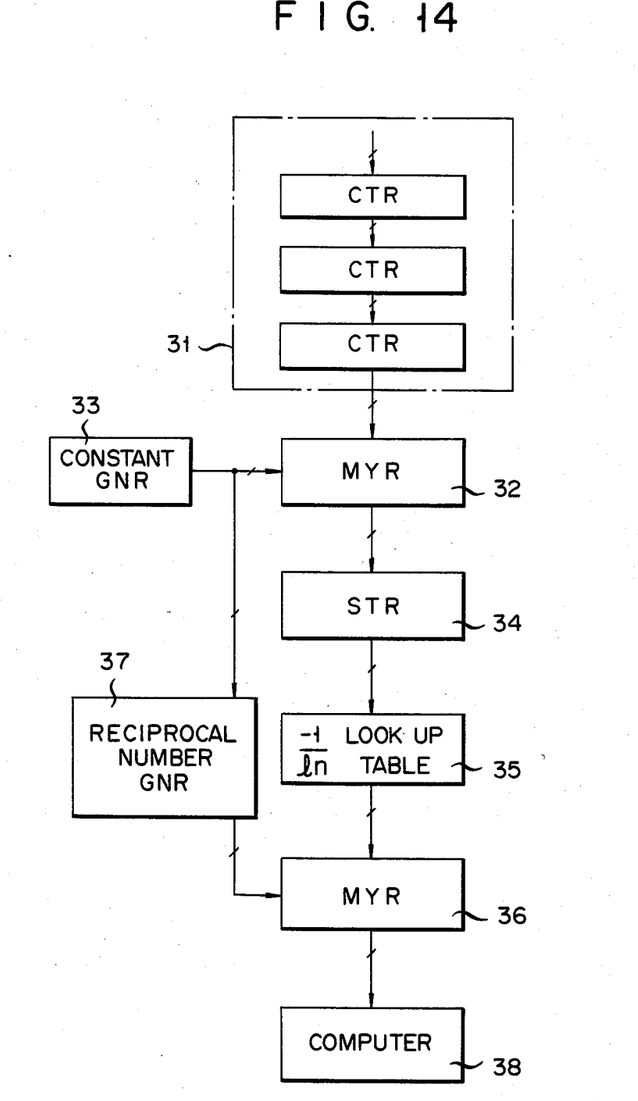
FIG. 14 shows a block diagram of a correction circuit used in combination with the measuring system shown in FIG. 10.

The measuring circuit and the correcting circuit for executing the equation (11) are illustrated in FIGS. 10 and 14.

In FIG. 10, a radiation detector 11 detects arrival photons and produces a pulse signal. A discriminator 12 operates is response to the output signal from the detector 11 to discriminate the effective signal from noise in the output signal from the detector to produce pulse signals with a given pulse width ($t_{DS}$). FF1 is a D-type flip-flop of which the input terminal D is grounded and the clock input terminal CLK receives a clock pulse Cp at a fixed period $t_{CLK}$ from a clock pulse generator (not shown). The set terminal S of the FF1 is connected to the output terminal from the discriminator 12. FF1 is set by the signal applied to the set input terminal S and is reset by the clock pulse Cp to the clock input terminal CLK.

FF2 is a D type flip-flop which is coupled at the clock input terminal CLK with the clock pulse Cp, and at the data input terminal D with the output signal from FF1. At the leading edge of the clock pulse Cp, FF1 is set or reset according to a state of the output Q of FF1. An AND gate receives an output signal Q from the FF2 as a gate control signal to allow the clock pulse Cp to pass therethrough. A counter 16 is connected to the output of AND.

In such an arrangement, $t_{DS}$ is larger than the minimum pulse width to operate FF1, but is shorter than one period $t_{CLK}$ of the clock pulse Cp.

In the circuit, upon arrival of the photons, the detector 11 produces an output signal as shown in FIG. 11A. The output signal from the detector 11 is applied to the discriminator 12 where only the effective pulse signals are extracted. The extracted ones have a pulse width of $t_{DS}$, as shown in FIG. 11B and are applied to the set input terminal S of FF1.

The input clock pulse Cp as shown in FIG. 11C is applied to the input terminal CLK. The data input terminal is grounded. Accordingly, FF1 is set by the output pulse from the discriminator 12 applied to the set input terminal S, and is reset by the clock pulse Cp. The output state of FF1 is as shown in FIG. 11D. Upon arrival of the photons, the output of the FF1 is at logical "H" level. When the photons successively arrive at a short time interval, the FF1 output is at logical "H" level at least during its period of the photon arrival.

The output Q of FF1 is applied as data input to FF2 which in turn is set by this input data and is reset by the clock pulse Cp. The output state of FF2 is as illustrated in FIG. 11E.

The output Q is produced every time that the detected photon signal appears.

The output Q of FF2 is applied as a gate control signal to the AND gate. During a period that the output Q of FF2 is at logical "H", the AND allows the clock pulse Cp to pass therethrough, as shown in FIG. 11F, and applies it to the counter 16. The counter 16 counts the clock pulses Cp.

In this way, the AND gate is enabled every time a photon arrives, and the clock pulses Cp are counted progressively.

Thus, the photons at the time intervals longer that $t_{CLK}$ are individually counted. The photons arriving at the time intervals within $t_{CLK}$ are not individually counted, but the counter is counted up by one every $t_{CLK}$. Accordingly, the linear increase curve as shown in FIG. 13 is obtained.

The photons arriving at the interval of $t_{CLK}$ are counted. However, the arrival of X ray photons has the Poisson distribution, and the count result thus obtained and the number of real arrival photons are related by the equation (7). Therefore, if the result of the count is multiplied by r, the number of the arrival photons is corrected and approximate to the true value.

A correction circuit for such correction will be described referring to FIG. 14. In the figure, reference numeral 31 designates a counter for holding the result of the count. The counter is of the parallel shift register type and includes a number of channels in which data successively shifts to the correction circuits at the subsequent stages. A multiplier 32 multiplies the data R from the counter 31 by the output $t_{CLK}/T$ from a constant generating circuit 32 to calculate the count per unit. In the system in which $t_{CLK}/T$ is not constant, T or $t_{CLK}$ is actually measured and a division circuit for per-forming $t_{CLK}/T$ is used for the constant generating circuit 33. The multiplier circuit 32 produces an output of "$R \times t_{CLK}/T$".

A subtractor 34 performs a calculation of $1 - t_{CLK}/T \times R$. 35 designates a look-up table made up of ROM (read only memory) or RAM (random access memory). The result of the subtraction in the subtractor circuit 34 is used as address data. Data stored in the address location is read out with the address data. If the address data is $1 - t_{CLK}/T \times R$, the look-up table produces $$-\ln\left(-\frac{t_{CLK}}{T} \cdot R\right)$$

A multiplier 36 multiplies the data $$-\ln\left(-\frac{t_{CLK}}{T} \cdot R\right)$$

read out from the look-up table 35 by an output signal $T/t_{CLK}$ from a reciprocal generator for generating reciprocal data as the output signal from the constant generator circuit 33. The result of the multiplication is applied to the host computer system.

In such a correction circuit, when the counter 31 in the measuring circuit, which holds the result of count, supplies the count data to the multiplier 32, the multiplier circuit 32 multiplies the data R from the counter 31 by the constant data of $t_{CLK}/T$ from the constant generator circuit 33. The result of the multiplying operation is $$R \times \frac{t_{CLK}}{T}$$

and is applied to the subtractor 34 where it is subtracted from "1", thereby to obtain $$1 - \frac{t_{CLK}}{T} \cdot R.$$

The result of the substraction is applied as an address to the look-up table 35 which provides data located at the specified address. If the address data is $1 - t_{CLK}/T.R$, the table 35 provides $$-\ln\left(-\frac{t_{CLK}}{T} \cdot R\right)$$

The data read out from the table 35 is multiplied by the output signal from the receiprocal generator 37, $$\frac{-1}{\ln\left(1 - \frac{t_{CLK}}{T} \cdot R\right)} \times \frac{T}{t_{CLK}},$$

so that the count of the counter is corrected to be in proximity to a true value, i.e. the number of the actual arrival photons. The result of the count correction is applied to the host computer 27 for reproducing a picture of the object under diagnosis.

In this way, if the response of the counter is slow, the radiation quantum or photons with a high frequency in their occurence can be measured according to the present invention.

Figure 15:
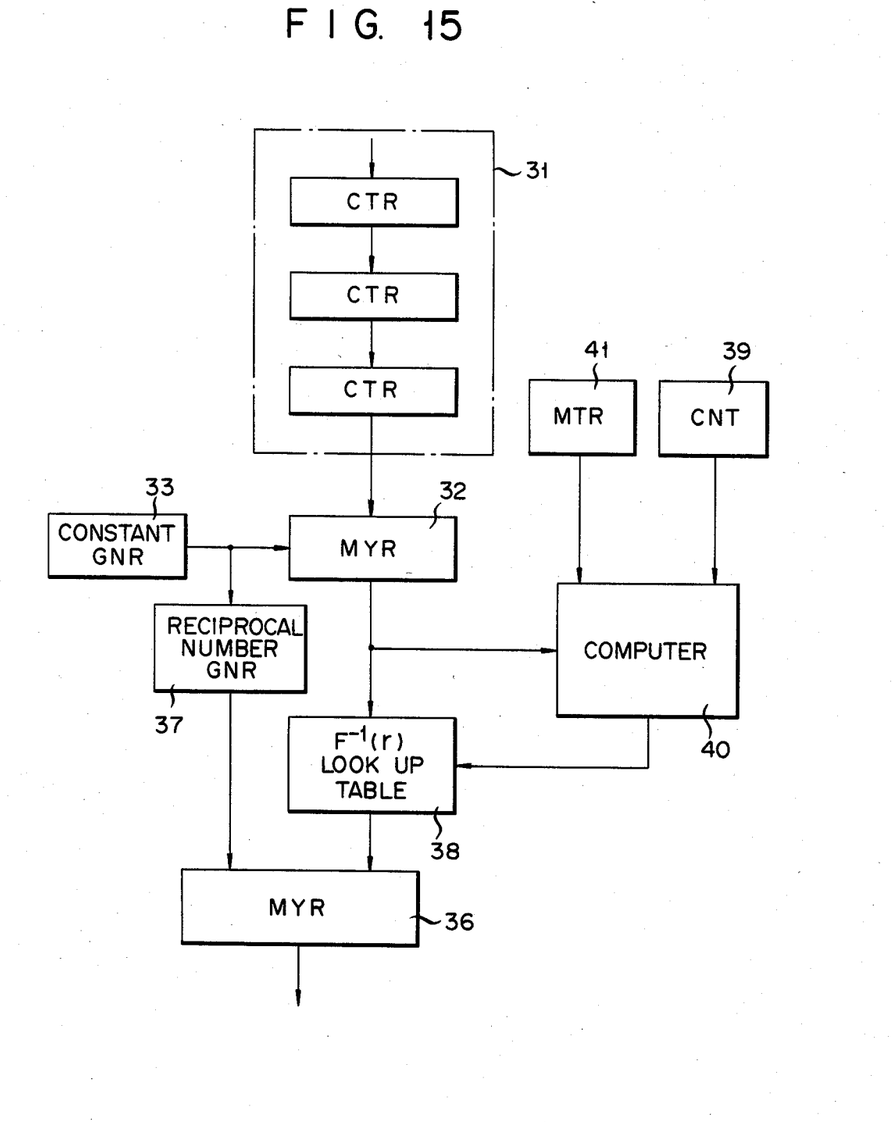
FIG. 15 is a block diagram of another embodiment of a correction circuit.

FIG. 15 shows a block diagram of an expansion of the correction circuit shown in FIG. 14. In the equation (7), contribution of the second and third terms to the r is small. However, the probability P(2) may change due to characteristic variations of the discriminator 12 and other circuit components, damaging the stability of the r. The circuit of FIG. 15 is so designed as to calibrate the r at any time, if necessary. The functions of the circuits 31, 32, 33, 36 and 37 are the same as those in FIG. 14. Reference numeral 38 designates a look-up table for obtaining $$M\left(=\frac{t_{CLK}}{T} \cdot N\right) \text{ from } r = \frac{t_{CLK}}{T} \cdot R,$$

which is formed in RAM. When an instability of the P(2) is negligible, it may be formed in ROM. The equation (7) indicates the r is a function given by $r = F(M)$. The look-up table 38 generates an inverse function $M = F^{-1}(r)$. The function of $M = F^{-1}(r)$ is given through the calibration. In operation, material with a known attenuation rate is placed on an X ray path using an attenuation controller provided near the radiation port of a radiation source in a CT scanner, for example. A monitor measures a dosage of radiation radiated from the X ray source and transmitted through the radiation attenuation material. The dosage of the radiation is applied to the host computer. A dose rate of the radiation from the radiation source and the known attenuation rate are also applied to the computer 40. The output signal (r) from the multiplier circuit 32 is also applied to the computer 40. The computer 40 can know the data from the attenuator controller 39 and the dosage monitor 41, and therefore can calibrate $F^{-1}(r)$. A look-up table for converting from r to M is prepared on the basis of the average $F^{-1}(r)$ of each channel by the host computer 40. The prepared data is applied to the look-up table 38. In this way, the calibration is completed. Through the signal processing using the look-up table data, the correction is made at a high degree of accuracy. The multiplier circuit 36, the inverse function generating circuit 37, the look-up table 38, the multiplier 32 and the constant generating circuit 33 are unnecessary if the $F^{-1}(r)$ of each channel is stored into the host computer 40, and an accurate $F^{-1}(r)$ is obtained by software using the output data from the multiplier 32, the known T and $t_{CLK}$, and the count value R from the counter 31. The FIG. 15 circuit can measure the arrival photons at the high frequency of their occurrence, keeping a high measuring accuracy, if the detector has a "bunching" of the photons appearing at their intervals within $t_{DS}$.

In the radiation measuring circuit of the type in which the number of photons arriving or appearing in Poisson distribution is measured by counting an output signal of the arrival photons from a radiation detector depending on the average rate of photons arriving within a unit time, the counting coefficient varies with a given characteristic. The present invention is based on this feature. The average rate at which photons are projected into the radiation detector can be predicted on the basis of the dose rate of the radation from a radiation source. In the present invention, the counting coefficient of a counting circuit for the average rate of photons is previously obtained. The count value in the measuring circuit is corrected by the counting coefficient and a count value for 100% of the counting coefficient is finally obtained. Therefore, a large number of photons arriving randomly can be measured at a very high accuracy if the response characteristic of the measuring circuit is not high. The requirement of a high response characteristic for the measuring system is not strict, leading to cost reduction.

The photons of X rays, used as radiation quantum appearing in the Poisson distribution in the abovementioned embodiments, may be replaced by any other radiation quantum if it appears in the Poisson distribution.

As described above, the radiation measuring device according to the present invention can measure radiation quantum randomly arriving at a high frequency even if the response characteristics of the detecting system are not high.

Further, it should be understood that the present invention may undergo various changes and modifications within the scope of the invention.

What is claimed is:

1. A radiation measuring apparatus comprising:
    detecting means for detecting photons of radiation impinged thereon and producing pulses thereof, the photons impinging on said detector means in Poisson distribution, and said pulses having width $t_{DS}$;
    counting means, including clock pulse generator means for generating clock pulses independent of said pulses and having width $t_{CLK}$ which is larger than width $t_{DS}$, for counting said clock pulses during an interval T when at least a part of said pulses exists in one cycle prior to a presently occurring cycle of said clock pulses, and producing a count R; and
    correcting means for correcting said count R to compensate for those pulses missed by said counting means and calculating a corrected count R' using the count R, clock width $t_{CLK}$ and interval T.

2. A radiation measuring apparatus according to claim 1 wherein said counting means comprises a first flip-flop which is set in response to said pulses and reset in response to said clock pulses, a second flip-flop which is set in response to the output from said first flip-flop and reset in response to said clock pulses, and gate means, one input of which receives an output of said second flip-flop and the other input of which receives said clock pulses, for producing said count R.

3. A radiation measuring apparatus according to claim 1, wherein said correcting means calculates the corrected R' from the following equation, $$R' = -\ln\left(1 - \frac{t_{CLK}}{T} \cdot R\right) \times \frac{T}{t_{CLK}}$$

4. A radiation measuring apparatus according to claim 1, in which said correcting means includes constant generating means for generating a first output signal representing $t_{CLK}/T$, multiplying means for multiplying said count R by said first output signal and producing a second output signal $t_{CLK}/T \times R$, subtracting means for subtracting said second output signal from 1 and producing a third output signal $(1 - t_{CLK}/T \times R)$, converting means for receiving said third output signal and producing conversion data $-\ln(1 - t_{CLK}/T \times R)$, reciprocal number generating means for receiving said first output signal and producing reciprocal data $T/t_{CLK}$, and multiplying means for multiplying said conversion data by said reciprocal data to produce data $-\ln(1 - t_{CLK}/T \times R) \times T/t_{CLK}$.

5. A radiation measuring apparatus according to claim 1, in which said correcting means includes constant generating means for generating a first output signal representing $t_{CLK}/T$, multiplying means for multiplying said count R by said first output signal and producing a second output signal $t_{CLK}/T \times R$, converting means for receiving said second output signal and converting it to average rate M ($M = t_{CLK}/T \times N$, where N is the number of photons of radiation arriving at said detecting means within a time period of $t_{CLK}$), reciprocal number generating means for receiving said first output signal and producing reciprocal data $T/t_{CLK}$, and multiplying means for multiplying said average rate M by said reciprocal data and producing corrected data $M \times t_{CLK}/T \times R$.

* * * * *